April 17, 1956     E. G. TOBIN     2,742,319
APPARATUS FOR MOVING PIPE
Filed July 30, 1952     2 Sheets-Sheet 1
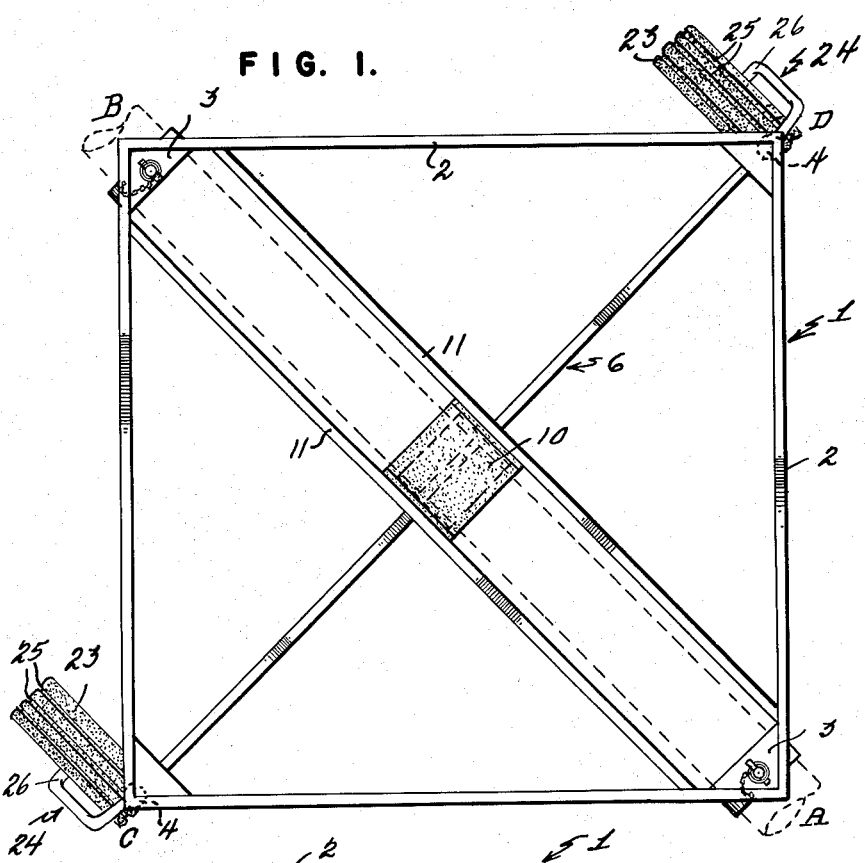
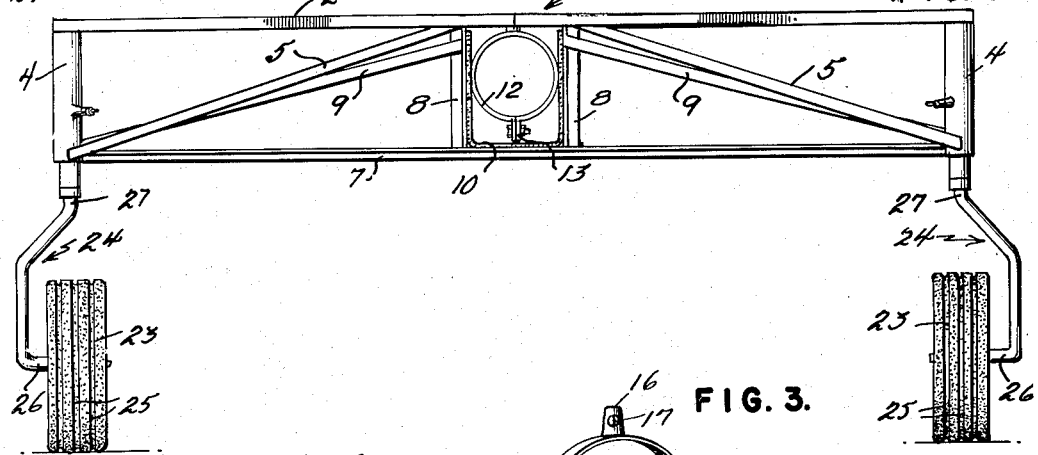
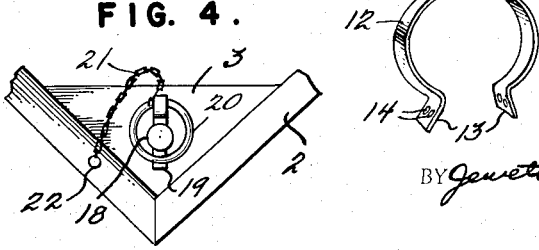
INVENTOR
EDGAR G. TOBIN
ATTORNEYS April 17, 1956
E. G. TOBIN
2,742,319
APPARATUS FOR MOVING PIPE
Filed July 30, 1952
2 Sheets-Sheet 2
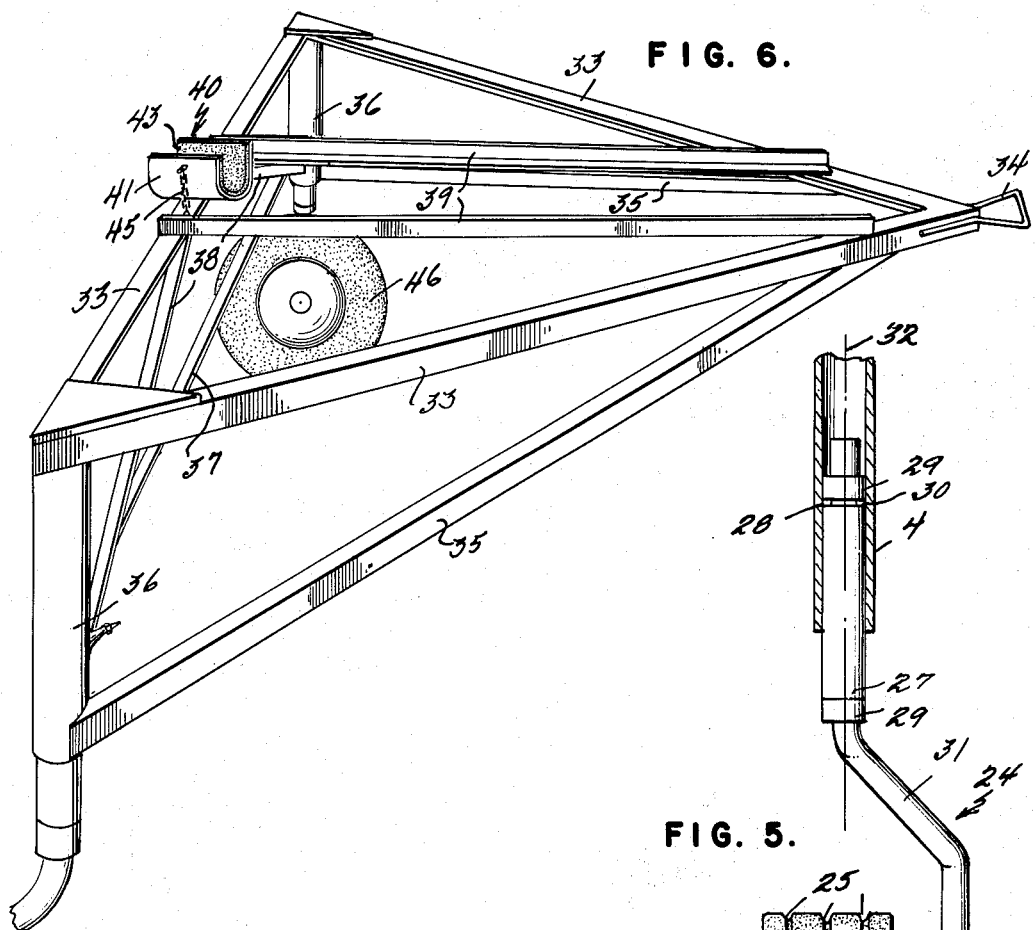
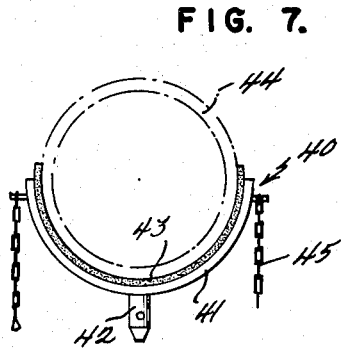
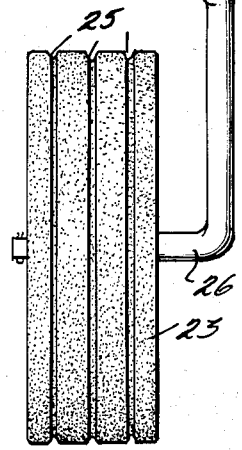
INVENTOR
EDGAR G. TOBIN
ATTORNEYS

United States Patent Office 2,742,319
Patented Apr. 17, 1956

2,742,319

APPARATUS FOR MOVING PIPE

Edgar Gardner Tobin, San Antonio, Tex.; Margaret Batts Tobin, independent executrix of said Edgar Gardner Tobin, deceased Application July 30, 1952, Serial No. 301,671

9 Claims. (Cl. 299—47)

This invention relates to a method and apparatus for moving pipe and more particularly to a method and apparatus for moving relatively long lengths of coupled pipe sections.

The present invention is directed to the problem of quickly moving long lengths of coupled portable pipe sections from one area to another. While the invention has general utility, as applied to coupled pipe sections, it has particular utility for moving portable irrigation pipe wherein the total length of pipe is made up of coupled pipe sections. Portable irrigation pipes are finding increased use for watering large areas of farm land but there has always been the problem of moving the pipes from a watered area to the next area to be watered. The total length of pipe to be moved can be quite appreciable when it is considered that one length of pipe can be made up of as many as sixty twenty-foot pipe sections. It is obvious that the uncoupling of the pipe sections and their movement, section by section, to a new area to be watered can be quite time consuming.

It is therefore an object of the present invention to provide a new and improved method and apparatus useful for quickly moving long lengths of coupled pipe sections from one area to another area.

It is another object of the present invention to provide such a method and apparatus wherein the coupled pipe sections can be moved as a unit from one area to another area.

It is still another object of the present invention to provide such a method and apparatus whereby the long lengths of coupled pipe sections can be moved readily over wet ground as, for instance, where the pipe being moved is portable irrigation pipe which has just been used to water a particular area.

Briefly described, a preferred embodiment of the apparatus of the present invention is a two-wheeled carrier cart adapted to support two coupled pipe sections at each side of the joint between them in such a manner that the sections are supported above ground with the coupling between sections being located substantially at the center of the carrier cart. The wheels of the carrier cart are pivotally connected to the carrier frame in such a manner that the wheels will swivel, in the manner of casters, and thus maintain the correct alignment when the cart is towed. Furthermore, the pipe sections are supported by bracket members which are also pivotally connected to the carrier frame thus enabling the pipe sections to pivot substantially horizontally with respect to the frame as the pipe is towed.

In practicing the method of the present invention a "train" is made up in which the coupled pipe sections are supported for movement by carrier carts located at each coupling between sections. The couplings are flexible joints whereby the sections can move out of longitudinal alignment with each other, if necessary, as they are moved. Adjacent pipe sections are pivotally connected to a carrier cart adjacent the flexible coupling between them. Thus, two adjacent pipe sections will be supported by one carrier cart so that each pipe section is pivotally connected to the carrier cart adjacent the flexible coupling between them and the flexible coupling is positioned substantially centrally of the carrier cart. When all of the coupled pipe sections, and associated carrier carts are finally assembled into train relation, there will be a carrier cart at each flexible joint supporting the adjacent pipe sections in the manner described.

By virtue of the flexible coupling between pipe sections and the pivotal connection of the sections to the carrier carts, it is possible to tow the whole assembly as a unit with the pipe and carts falling in line as the towing proceeds. Furthermore, the flexible couplings between sections and the pivotal connections of the sections to the carrier carts enables a whole length of pipe to assume an arc shape if it is desired to turn in going to another area.

Further objects and advantages of the present invention will become more apparent from the following detailed description taken in conjunction with the attached drawings in which:

Fig. 1 is a plan view of a pipe carrier according to one embodiment of my invention, the two sections of pipe adapted to be supported by said pipe carrier being shown in dotted outline;

Fig. 2 is an elevation view of the pipe carrier shown in Fig. 1 looking toward a corner in the direction of the arrow shown in Fig. 1;

Fig. 3 is a detailed perspective view of a pipe supporting bracket forming part of the pipe carrier;

Fig. 4 is a detailed plan view of a corner of the pipe carrier shown in Fig. 1, this Fig. 4 showing means for retaining the pipe bracket of Fig. 3 with respect to the frame shown in Fig. 1;

Fig. 5 is an enlarged elevation view of one of the wheels and wheel supporting assemblies shown in Figs. 1 and 2;

Fig. 6 is a perspective view of another embodiment of my invention, and

Fig. 7 is a detailed view in elevation of the pipe supporting saddle shown in Fig. 6.

Inasmuch as the present invention is found to have particular utility for moving portable irrigation pipe from one area to another, the embodiments of the invention illustrated on the drawings are embodiments which are particularly suitable for such use. The embodiment of the invention illustrated in Figs. 1–5 of the drawings is a pipe carrier adapted to support coupled sections of portable irrigation pipe above ground and enable these coupled sections to be towed as a unit to another area. The embodiment of the invention illustrated in Figs. 6 and 7 is particularly adapted for use as a pipe puller whereby sections of pipe supported by the pipe carriers may be towed.

Referring now to Figs. 1 and 2 of the drawings, the pipe carrier shown there includes a polygonal square frame, designated generally by the reference numeral 1, having top side members 2 which are suitably joined together at the corners of the frame to provide a substantially rigid unitary structure. The individual frame members 2 are preferably lengths of angle iron to provide the necessary strength although round or square stock of any suitable material may be used. In the embodiment shown, the frame members 2 are preferably connected by welds and, in fact, welding is used to provide the rigid connections between frame parts where such connections are needed although other suitable connecting means could be provided if desired.

By virtue of the square shape of frame 1, as seen in plan view in Fig. 1, the frame has four corners which are designated by the letters A, C, B, D, in Fig. 1. As shown, corners A and B are diagonally opposite each other and corners C and D are also diagonally opposite each other. Obviously, a line extending or passing through corners A and B will be substantially at right angles to a line passing through corners C and D.

A trianglar gusset 3 is located at each of the corners A and B and a hollow post or sleeve 4 is located at each of the corners C and D. An inclined side bracing member 5, which is preferably of angle iron configuration, extends from each corner post 4 to each of the corners A and B as seen best in Fig. 2. Thus, each side of the frame 1 is a triangular frame subassembly in which the three sides of the triangle are made up of the substantially horizontal top side angle iron 2, the inclined side angle iron 5, and the hollow post 4. As previously mentioned, all of these parts are preferably connected together by being welded to each other.

A cross brace, indicated generally by the reference numeral 6, is connected to and extends between the diagonally opposite corners C and D, being connected to the hollow posts 4 located at these corners. This cross brace 6 is made up of a horizontally extending angle iron section 7 which extends completely between corners C and D as is shown in Fig. 2. Upstanding angle iron sections 8 are connected to and extend upwardly from angle iron 7, these angle iron sections 8 being spaced apart from each other and being centered on angle iron 7 as shown in Fig. 2. The upstanding sections 8 are braced by inclined angle iron sections 9 which extend from substantially near the top of each section 8 to each hollow post 4 as is also shown in Fig. 2. The pairs of connected angle iron sections 7, 8 and 9 form triangles as seen in Fig. 2.

A pipe receiving saddle member 10, the purpose of which is described more fully hereinafter, is connected to the angle iron sections 8 and 7 by suitable means such as rivets and is positioned in the substantially U-shaped space defined by these angle iron sections as is shown in Fig. 2. This saddle member 10 is preferably made of a suitable cushioning material such as rubber or leather.

Additional bracing for the frame 1 is provided by a pair of angle iron sections 11 which extend diagonally between corners A and B being spaced apart substantially equally from a line passing through corners A and B as shown in Fig. 1. The bracing members 11 are substantially horizontal members which are connected to the top side angle iron members 2 and which pass over and are connected to the upper ends of the upstanding angle iron sections 8. In fact, the spacing between bracing members 11 corresponds substantially to the spacing between the upstanding angle iron sections 8. This can be observed from Fig. 2.

When pipe is supported by the carrier shown in Figs. 1 and 2, the pipe is engaged by the generally circular bracket 12 shown in Fig. 2 and shown individually, in unattached relation, in Fig. 3. This pipe engaging bracket 12 is a strap-like metal member which is adapted to wrap around the pipe and snugly encircle it, the bracket being provided with two end portions 13 each adapted to abut each other as shown in Fig. 2 and each having openings 14 therein which may be aligned to receive clamping bolts 15. Thus, when the bracket 12 is placed around the pipe and the ends 13 bolted together the bracket is then ready to be connected to a carrier.

The connection between pipe bracket 12 and the carrier frame 1 is provided by an upstanding post or lug 16 which is preferably welded to bracket 12 and which has an opening 17 extending horizontally therethrough as shown in Fig. 3. Post or lug 16 is passed upwardly through an opening 18 in the triangular substantially horizontal gusset 3. When lug 16 is thus passed through the opening 18 of a gusset 3, the substantially horizontal opening 17 in the lug is above the gusset and is thus adapted to receive a key 19 which is passed horizontally into and through opening 17 to hold lug 16 from slipping back down and out of opening 18. For convenience of handling, key 19 is mounted on a ring 20 which is attached by a chain 21 to a bolt 22 connected to an angle iron section 2. It is thus apparent that the pipe engaging bracket 12 may be readily connected to and disconnected from frame member 1 and that when it is connected to frame member 1 the connection is a pivotal one whereby the bracket may rotate with respect to gusset plate 3. The advantages of this are discussed more fully hereinafter.

The pipe carrier shown in Figs. 1 and 2 is a two-wheeled vehicle. Thus, ground contacting wheels 23 are connected to the carrier frame 1 at each of the diagonally opposite corners C and D by means of the wheel carrying arms designated generally by the reference numeral 24. The ground contacting wheels 23 are preferably provided with a relatively broad tread and with circumferentially extending grooves 25 in order to facilitate their travel across wet ground which has just been watered. Obviously, the broad tread tends to prevent the wheels from sinking too far into the ground while the grooves 25 tend to maintain the proper wheel alignment.

Each of the ground contacting wheels 23 is journaled for rotation on a substantially horizontal end arm portion 26 of the wheel carrying arm 24. This wheel carrying or supporting arm 24 also has an end portion 27 which extends upwardly into each hollow post or sleeve member 4 located at each of the corners C and D of frame 1. Details of this construction are shown more fully in Fig. 5 of the drawings.

As shown there, the hollow post or sleeve 4 has a rigidly connected inner concentric hollow sleeve extension 28 which extends downwardly therefrom. The upper end portion 27 of wheel carrying arm 24 extends through the hollow sleeve member 28 and up into the interior of hollow post or sleeve member 4 as shown in Fig. 5. Two stop members 29 are suitably attached, as by welding, to the upper end portion 27 of arm 24 and are located above and below sleeve 28 as shown in Fig. 5. There is a slight clearance of about 3/16 of an inch, indicated at 30 in Fig. 5, which permits a limited up and down movement of arm 24 with respect to sleeve 28 and, of course, with respect to hollow post 4. Otherwise, the stops 29 restrain arm 24 from up and down movement with respect to hollow post 4 but permit the arm to rotate or pivot with respect to post 4. Thus, each of the ground contacting wheels 23 is connected at each corner C and D of frame 1 for pivotal movement with respect to each corner.

It is obviously desirable that when the pipe carrier is being towed, the wheels 23 should maintain the correct alignment with respect to the direction of travel. Thus, assuming that the pipe carrier is being towed by a tow connection made at corner A of frame 1 so that corner A is in the lead then the wheels 23 should assume an alignment substantially that shown in Fig. 1. In other words, the wheels should have a castering action so that they can align themselves for proper rotation.

To permit such castering, each wheel carrying arm 24 has an inclined arm portion 31 which extends downwardly from each hollow post 4 and is inclined at an angle with respect to the longitudinal axis, designated at 32, of the hollow post. Not only is the angle of inclination outward with respect to the hollow post axis 32 but it is also rearward with respect to a line extending through corners C and D when draft is applied to the carrier at corner A. In other words, the substantially horizontal wheel supporting arm portions 26 of arms 24 are laterally offset from axis 32 and are located to the rear of corners C and D when draft is applied to the carrier at corner A. This manner of connection enables the wheels 23 to swivel properly and maintain their alignment as the carrier is towed.

The pipe carrier thus far described is particularly useful for moving coupled sections of portable irrigation pipe. The manner in which this is accomplished is described as follows.

Long lengths of portable irrigation pipe are made up of individual pipe sections which are coupled together by flexible couplings. When it is desired to move a number of these coupled sections as a unit from one area to another, a pipe engaging bracket 12 is connected to each pipe section adjacent each end of the pipe section. In fact, the brackets 12 could be left connected to the pipe once they are properly spaced from the pipe ends for cooperation with the pipe carriers.

When the bracket 12 is connected to a pipe section so that the lug 16 can be passed through opening 18 in a gusset plate 3 then the pipe section is raised off the ground so that it can be pivotally connected to one of the corners A and B of the pipe carrier adjacent an end of the pipe section. Thus, the lug 16 of pipe engaging bracket 12 is passed through opening 18 and the key 19 engaged in opening 17 to key the bracket to the frame 1 and yet permit it to pivot horizontally. Each adjacent end portion of adjacent pipe sections is so connected to a carrier cart whereby said end portions are pivotally connected to corners A and B of frame 1 and the proportioning is such that the flexible coupling between adjacent pipe sections will be within and protected by saddle 10 after the connections are made. In fact, after the corner connections are made, the adjacent ends of adjacent pipe sections can be readily flexibly coupled together at saddle 10.

When the connections are thus completed for a particular carrier cart, there is a pivotal connection at each of two opposite corners of the cart and a flexible coupling centrally of the cart which gives freedom of lateral movement for the adjacent coupled pipe sections. Furthermore, the pivotal connections and flexible coupling are in substantial alignment insofar as the line of draft is concerned. While dimensions will vary for particular size carts and particular lengths of pipe, a carrier dimension in which the sides 2 are approximately four feet in length has been found to be satisfactory for transporting coupled twenty-foot pipe sections. The pipe sections are supported approximately two and one-half feet from the ground.

A whole train of coupled pipe sections can be formed by providing a carrier cart at each joint, each carrier cart supporting two adjacent pipe sections at each side of the flexible coupling between them in the manner described in detail immediately above. Thus, the complete train will include the coupled pipe sections and the carts and the whole assembly can be towed readily from one area to another with the carts and pipe falling in line and following the line of draft established by the towing vehicle. The pivotal connections between the pipe sections and the carrier, the flexible coupling between individual pipe sections, and the castering action of the ground contacting wheels 23 enables the whole pipe train to follow the towing vehicle even on turns which, when they occur, cause the whole pipe length to assume a gradual arc.

A pipe carrier constructed according to the embodiment of my invention thus far described has been found to work extremely well in quickly moving portable irrigation pipe sections from one area to another. Using such carriers, it is possible for two men to move sixty sections of irrigation pipe (each section being twenty feet long) in about an hour and one-half whereas it would take six men approximately all day to move the sections by ordinary methods. It will be understood by those skilled in the art that it is customary to uncouple the pipe and move it section by section which, as indicated, can be quite time consuming.

The embodiment of my invention illustrated in Figs. 6 and 7 of the drawings is particularly adapted to be used as a pipe puller and can be the lead vehicle in a train of pipe carriers. This pipe puller, as seen in Fig. 6, is a generally triangular frame member having top side angle iron members 33 which form a triangle having a towing bracket 34 located at its apex. Two sides of the triangular frame are provided with inclined braces 35 which extend from the hollow corner posts 36 to the apex of the triangular frame as shown in Fig. 6. The third, or base side of the triangular frame, includes a bottom horizontal bracing arm 37 and two inclined bracing arms 38, each of the latter extending from a corner post 36 to substantially midway of the length of the top side angle member 33 which extends between corner posts 36. Substantially horizontal top bracing members, which are angle iron sections and are designated by the numeral 39, extend from the apex of the triangular frame to the base side as shown in Fig. 6. These top braces 39 are spaced apart as is also shown in Fig. 6.

A substantially U-shaped saddle member, indicated generally by the reference numeral 40, is pivotally connected to the triangle base top angle iron member 33 substantially midway of the length of the member 33 as shown in Fig. 6. Saddle member 40 is made up of a substantially semi-circular metal frame member 41 which is provided with a downwardly extending lug 42 which engages a suitable opening in angle member 33. The details of the pivotal connection are not important, it being understood that the semi-circular shaped rigid member 41 will be suitably supported for pivotal movement with respect to the angle member 33. A cushioning lining 43 is suitably attached to the inner surface of the semi-circular shaped member 41 and is adapted to receive and cushion a pipe, the outline of a pipe so positioned on saddle 40 being indicated by the dot and dash lines 44 shown in Fig. 7. The saddle member 40 is also preferably provided with a suitable pipe clamping means such as the chain clamp 45 shown in Fig. 7.

The pipe puller shown in Fig. 6 has the same ground contacting wheel arrangement as the pipe carrier shown in Figs. 1 and 2. In other words, the ground contacting wheels, one of which is indicated in outline at 46, are journaled on wheel carrying arms which are pivotally connected to hollow posts 36 in a manner such that the wheels may swivel with respect to the frame when it is being towed by means of a vehicle applying draft to the towing bracket 34.

In use, when it is desired to move pipe, the pipe is placed so that it rests, adjacent one end, in saddle 40. The pipe will be suitably clamped against the saddle by means such as the chain clamp 45. Then, when draft is applied at bracket 34 so that the apex of the frame is in the lead, the wheels 46 will assume their proper alignment in trailing relation and the whole assembly, frame and pipe, will move in the proper direction. The pipe puller is thus adapted for use as the lead vehicle in a pipe train.

From the foregoing description, it will be seen that I have provided an improved method and apparatus for moving sections of pipe. As indicated, my invention finds particular utility in moving long lengths of coupled sections of portable irrigation pipe. By means of the preferred embodiment of my invention, which is illustrated in Figs. 1–5, it is possible for two men to do the work of six men in a fraction of the time which it would take the six men. In other words, it is unnecessary to move the pipe section by section from one area to another and, instead, it can be moved as a unit by means of my invention.

While, in Figs. 1 and 2, I have shown a square sided frame, it will be understood that the frame could be a polygon of having a different number of sides or it could even be circular in plan outline. The important point is that the line of draft should extend through diagonally opposite locations, such as the corners A and B, and be substantially at right angles to the pivot locations of the castering wheels 23. A square outline frame is found to provide this desired result readily but, as indicated, other shapes could be provided if desired. The structure of the frame, as previously mentioned, is preferably made of strong angle iron members and welding is used to provide the necessary rigid connections. It is found that this makes a sturdy and relatively inexpensive carrier cart which is admirably suited for the purpose intended.

Accordingly, while I have described and illustrated specific embodiments of my invention, I wish it to be understood that I do not intend to be restricted solely thereto but that I do intend to cover all modifications thereof which would be apparent to one skilled in the art and which come within the spirit and scope of my invention.

What I claim as my invention is:

1. A pipe carrier useful for moving portable irrigation pipe from one area to another and adapted to support a pair of jointed pipe sections adjacent their joint, said carrier comprising a frame adapted to be towed substantially horizontally across the ground, said frame having a pair of oppositely disposed wheel-carrying arms extending therefrom, each of said arms being pivotally connected to the frame and each having a ground-contacting wheel journaled for rotation thereon, a pipe-receiving saddle for supporting the joint between said pipe sections, said saddle being connected to said frame substantially midway between said pair of wheel-carrying arms substantially on the line of draft of said pipe carrier, and a pair of oppositely disposed pivotally mounted pipe support means carried by said frame substantially on the line of draft of said pipe carrier and adapted to grip said respective pipe sections on opposite sides of said joint.

2. A pipe carrier useful for moving portable irrigation pipe from one area to another and adapted to support a pair of jointed pipe sections adjacent their joint, said carrier comprising a frame adapted to be towed substantially horizontally across the ground, a pair of oppositely disposed wheel-carrying arms extending downwardly from said frame, each of said arms being pivotally connected to said frame and each having a ground-contacting wheel journaled for rotation thereon, a cross brace for said frame, said cross brace extending across said frame between the pivotal connections between the wheel-carrying arms and said frame, a pipe-receiving saddle for supporting the joint between said pipe sections, said saddle being connected to said cross brace substantially midway of the length thereof substantially on the line of draft of said pipe carrier, and a pair of oppositely disposed pivotally mounted pipe support means carried by said frame substantially on the line of draft of said pipe carrier and adapted to grip said respective pipe sections on opposite sides of said joint.

3. A pipe carrier useful for moving portable irrigation pipe from one area to another and adapted to support a pair of jointed pipe sections adjacent their joint, said carrier comprising a frame adapted to be towed substantially horizontally across the ground, said frame having a pair of oppositely disposed hollow post members, a wheel-carrying arm pivotally connected to and extending downwardly from each of said post members, said arm having a substantially horizontal arm portion laterally offset from the longitudinal axis of the post member from which it extends, a ground-contacting wheel journaled for rotation on said horizontal arm portion, the offset of said horizontal arm portion permitting said wheel to trail with respect to the post member with which it is associated when said frame is towed, a cross brace connected to and extending between said post members, means attached to said cross brace substantially midway of the length thereof for supporting the joint between said pipe sections, and a pair of oppositely disposed pivotally mounted pipe support means carried by said frame and adapted to grip said respective sections on the opposite sides of said joint, said means attached to said cross brace and said pivotally mounted pipe support means being disposed substantially on the line of draft of said pipe carrier.

4. A pipe carrier useful for moving coupled sections of portable irrigation pipe from one area to another, said carrier comprising a frame adapted to be towed substantially horizontally across the ground, support means carried by said frame for supporting a pair of coupled pipe sections at their coupling, said frame having a pair of oppositely disposed posts and a pair of oppositely disposed pivotally mounted pipe-engaging members, said pipe-engaging members being disposed on opposite sides of said support means for engaging the respective pipe sections on opposite sides of said coupling, the relationship between said pair of posts and said pair of pipe-engaging members being such that a line passing through said pair of posts is located substantially at right angles to a line passing through said pair of pipe-engaging members, a pair of ground-contacting wheels, and means pivotally connecting the ground-contacting wheels to said oppositely disposed posts.

5. A pipe carrier useful for moving coupled sections of portable irrigation pipe from one area to another, said carrier comprising a frame adapted to be towed substantially horizontally across the ground, a pipe-receiving saddle carried by said frame for supporting a pair of coupled pipe sections at their coupling, said frame having a pair of oppositely disposed hollow posts and a pair of oppositely disposed pipe-supporting brackets, said brackets being pivotally connected to said frame, said brackets being disposed on opposite sides of said saddle for engaging the respective pipe sections on opposite sides of said coupling, the relationship between said pair of posts and said pair of brackets being such that a line passing through said pair of posts is located substantially at right angles to a line passing through said pair of brackets, a pair of ground-contacting wheels, and means pivotally connecting said ground-contacting wheels to said oppositely disposed hollow posts.

6. A pipe carrier useful for moving coupled sections of portable irrigation pipe from one area to another, said carrier comprising a substantially square frame adapted to be towed substantially horizontally across the ground, support means carried by said frame for supporting a pair of coupled pipe sections at their coupling, a pair of pipe-supporting brackets pivotally connected to each corner of one pair of diagonally opposite corners of said frame, said pipe-supporting brackets being disposed on opposite sides of said support means for engaging the respective pipe sections on opposite sides of said coupling, a pair of ground-contacting wheels, and means pivotally connecting a ground-contacting wheel to each corner of the other pair of diagonally opposite corners of said frame.

7. A pipe carrier useful for moving coupled sections of portable irrigation pipe from one area to another, said carrier comprising a polygonal frame adapted to be towed substantially horizontally across the ground, said frame having a first pair of diagonally opposite corners and a second pair of diagonally opposite corners, the relationship between said respective pairs of corners being such that a line passing through one pair of corners is located substantially at right angles to a line passing through the other pair of corners, a substantially vertical hollow post located at each corner of said first pair of corners, a wheel-carrying arm associated with each of said posts, said arm having a substantially vertical end portion located in the post with which it is associated and connected thereto for rotation with respect to said post, said arm also having is substantially horizontal end portion laterally offset from the longitudinal axis of said post, a ground-contacting wheel journaled for rotation on said horizontal end portion, pivotally mounted means located at each corner of said second pair of diagonally opposite corners adapted to support said pipe section adjacent its coupling, a brace extending between the posts located at the corners of said first oppositely disposed pair of corners, and a pipe-receiving saddle connected to said brace substantially midway of the length of said brace for supporting a pair of coupled pipe sections at their coupling, said saddle and the pipe-supporting means at each corner of said second pair of corners being in substantial alignment whereby pipe may be towed on a line of draft extending through said saddle and said pipe-supporting means.

8. A pipe carrier useful for moving coupled sections of portable irrigation pipe from one area to another, said carrier comprising a square frame adapted to be towed substantially horizontally across the ground, a substantially vertical post located at each corner of one pair of diagonally opposite corners of said frame, a wheel-carrying arm pivotally connected to each of said posts, a ground-contacting wheel journaled for rotation on each of said arms, each of said arms extending downwardly from the post to which it is connected at an inclined angle with respect to the longitudinal axis of said post whereby each ground-contacting wheel may swivel with respect to the frame when the latter is towed across ground, a downwardly extending pipe bracket pivotally connected to said frame at each corner of the second pair of diagonally opposite corners of the frame, each of said pipe brackets being adapted to receive one of said pipe sections at a point adjacent but spaced from the coupling of said one section to another pipe section, a cross brace extending between each corner of the first pair of diagonally opposite corners of said frame, and a pipe-receiving saddle connected to said cross bracket substantially midway of the length thereof, said saddle being adapted to receive a pair of coupled pipe sections at their coupling, said saddle and said pipe-supporting brackets being located substantially on a common line of draft for said carrier.

9. A pipe train comprising a plurality of correspondingly shaped pipe sections disposed in substantially longitudinal alignment, adjacent sections being coupled together by a flexible coupling whereby said sections may flex with respect to each other, a plurality of carrier carts, there being a carrier cart located at each flexible coupling between sections, means carried by each carrier cart for supporting the flexible coupling of a pair of adjacent pipe sections and means pivotally connecting each pipe section to a carrier cart adjacent but spaced from the flexible coupling between said pipe section and the next adjacent pipe section.

References Cited in the file of this patent

UNITED STATES PATENTS

| | | |
|---|---|---|
| 664,240 | Doehring | Dec. 18, 1900 |
| 738,271 | Astle | Sept. 8, 1903 |
| 872,490 | Williamson et al. | Dec. 3, 1907 |
| 1,429,756 | Mitchell | Sept. 19, 1922 |
| 1,601,199 | Clapper | Sept. 28, 1926 |
| 2,652,282 | Willetts | Sept. 15, 1953 |

FOREIGN PATENTS

| | | |
|---|---|---|
| 4,470 | Great Britain | Mar. 2, 1901 |